United States Patent [19]

Hicks

[11] Patent Number: 4,974,934
[45] Date of Patent: Dec. 4, 1990

[54] SOLAR AIRCRAFT DETECTOR

[76] Inventor: Paul E. Hicks, 20847 E. Ave. R, Palmdale, Calif. 93550

[21] Appl. No.: 442,843

[22] Filed: Nov. 29, 1989

[51] Int. Cl.$^5$ .............................................. G02B 5/12
[52] U.S. Cl. ..................................... 350/97; 350/612; 350/616; 350/631
[58] Field of Search ................. 350/97, 100, 103, 109, 350/612, 616, 627, 630, 631

[56] References Cited

U.S. PATENT DOCUMENTS

| | | | |
|---|---|---|---|
| 1,635,267 | 7/1927 | Feinberg | 350/616 |
| 4,145,111 | 3/1979 | Hansson et al. | 350/97 |
| 4,277,141 | 7/1981 | Kleiber | 350/616 |
| 4,299,442 | 10/1981 | Buckelew | 350/97 |
| 4,768,861 | 9/1988 | Epner | 350/616 |

Primary Examiner—Bruce Y. Arnold
Assistant Examiner—Jay Ryan
Attorney, Agent, or Firm—Richard L. Miller

[57] ABSTRACT

A solar aircraft detector is provided and consists of a cylindrical housing secured to top surface of a fuselage of an aircraft. A plurality of reflectors are carried on the cylindrical housing for sending back light at various angles therefrom. The reflected light causes the aircraft to be visually identified and located by other aircraft pilots in the vicinity.

5 Claims, 1 Drawing Sheet

SOLAR AIRCRAFT DETECTOR

BACKGROUND OF THE INVENTION

The instant invention relates generally to reflectors and more specifically it relates to a solar aircraft detector.

Numerous reflectors have been provided in the prior art that are adapted to reflect light back in different directions to be seen. For example, U.S. Pat. Nos. 3,867,013 to Ashenfarb; 4,145,111 to Hansson et al and 4,299,442 to Buckelew all are illustrative of such prior art. While these units may be suitable for the particular purpose to which they address, they would not be as suitable for the purpose of the present invention as hereafter described.

SUMMARY OF THE INVENTION

A primary object of the present invention is to provide a solar aircraft detector that will overcome the shortcomings of the prior art devices.

Another object is to provide a solar aircaft detector that will pick up rays from the sun and reflect them in almost any direction so as to indicate that the aircraft is there.

An additional object is to provide a solar aircraft detector that will reflect strobe lights from other aircraft at night so that the aircraft will be visible to the other aircraft.

A further object is to provide a solar aircraft detector that is simple and easy to use.

A still further object is to provide a solar aircraft detector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
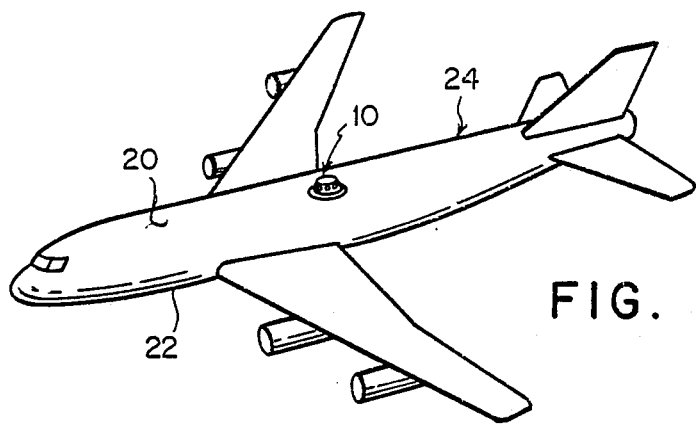
FIG. 1 is a perspective view of a typical aircraft showing the instant invention installed thereon.
Figure 2:
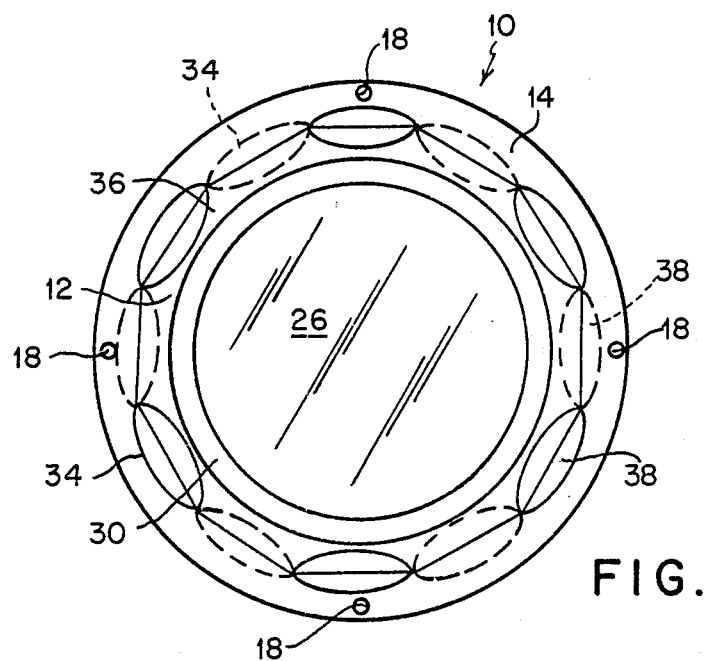
FIG. 2 is an enlarged diagrammatic top view of the instant invention.
Figures 3, 4:
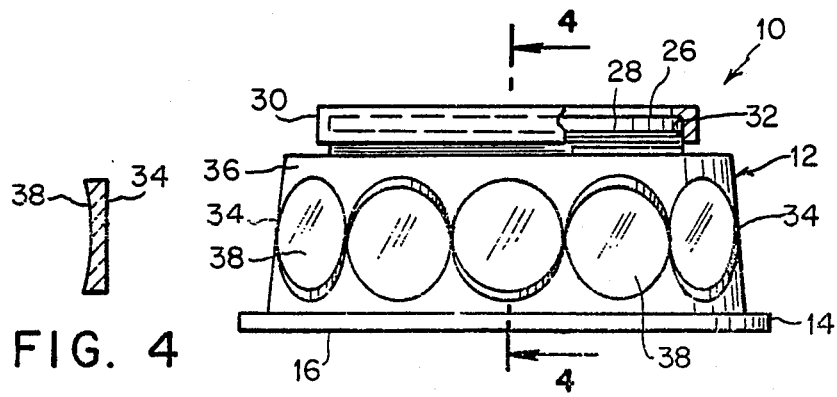
FIG. 3 is a diagrammatic side view thereof.
FIG. 4 is a cross sectional view taken along line 4—4 in FIG. 3 of just a single reflecting element per se.

Turning now descriptively to the drawings, in which like reference characters denote like elements throughout the several views, Figures illustrate a solar aircraft detector 10 consisting of a cylindrical housing 12 fabricated out of lightweight durable material, such as plastic or aluminum. An annular flange 14 extends outwardly from bottom 16 of the cylindrical housing 12. The flange 14 has a plurality of spaced apart apertures 18 therethrough for receiving fasteners which may extend into the top surface 20 of a fuselage 22 of an aircraft 24. A flat mirror 26 is provided on top 28 for the cylindrical housing 12 for reflecting light straight up. A bezel 30 having internal threads 32, threads onto the top 28 of the cylindrical housing 12 and holds the flat mirror 26 thereto.

A plurality of reflectors 34 are affixed about circumference 36 of the cylindrical housing 12 for sending back light at various angles therefrom, whereby the reflected light causes the aircraft 24 to be visually identified and located by other aircraft pilots in the vicinity. Each of the reflectors 34 is a side mirror having a concave surface 38, with every other one affixed at a slight angle up from the circumference 36 of the cylindrical housing 12 while the reflectors 34 in between are affixed at a slight angle down from the circumference 36 of the cylindrical housing.

To use the solar aircraft detector 10 a person simply attaches it to the top surface 20 of the fuselage 22 of the aircraft 24. During daylight flying, rays from the sun will be reflected and can be seen eight to ten miles away. It works especially well on landing and take off, also when in flight pattern, banking and making ninety degree turns. During night time take off or landing it will reflect for one mile strobe lights from other aircraft that are landing.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A solar aircraft detector comprising:
   (a) a cylindrical housing fabricated out of light weight durable material;
   (b) means for securing the bottom of said cylindrical housing to the top surface of a fuselage of an aircraft;
   (c) means on top of said cylindrical housing for reflecting light straight up;
   (d) means for removably mounting said reflecting means to the top of said cylindrical housing; and
   (e) a plurality of reflectors affixed about circumference of said cylindrical housing for sending back light at various angles therefrom, whereby the reflected light causes the aircraft to be visually identified and located by other aircraft pilots in the vicinity.

2. A solar aircraft detector as recited in claim 1, wherein said securing means includes an annular flange extending outwardly from bottom of said cylindrical housing, said flange having a plurality of spaced apart apertures therethrough for receiving fasteners which extend into the top surface of the fuselage.

3. A solar aircraft detector as recited in claim 2, wherein said reflecting means is a flat mirror.

4. A solar aircraft detector as recited in claim 3, wherein said removably mounting means is a bezel having internal threads which threads onto the top of said cylindrical housing and holds said flat mirror thereto.

5. A solar aircraft detector as recited in claim 4, wherein each of said reflectors is a side mirror having a concave surface with every other one affixed at a slight angle up from the circumference of said cylindrical housing while said reflectors in between are affixed at a slight angle down from the circumference of said cylindrical housing.

* * * * *